US007188200B2

(12) United States Patent
Griech

(10) Patent No.: US 7,188,200 B2
(45) Date of Patent: Mar. 6, 2007

(54) METHOD FOR DATA EXCHANGE BETWEEN AN OPERATING AND MONITORING PROGRAM AND A FIELD DEVICE

(75) Inventor: Reinhard Griech, Lorrach (DE)

(73) Assignee: Endress + Hauser Process Solutions AG, Reinach (CH)

( * ) Notice: Subject to any disclaimer, the term of this patent is extended or adjusted under 35 U.S.C. 154(b) by 736 days.

(21) Appl. No.: 10/198,738

(22) Filed: Jul. 19, 2002

(65) Prior Publication Data

US 2003/0023723 A1 Jan. 30, 2003

Related U.S. Application Data

(60) Provisional application No. 60/308,596, filed on Jul. 31, 2001.

(30) Foreign Application Priority Data

Jul. 25, 2001 (DE) ................................ 101 36 732

(51) Int. Cl.
*G06F 13/00* (2006.01)

(52) U.S. Cl. .......................... 710/100; 700/20; 700/21; 710/305; 710/306

(58) Field of Classification Search ........ 710/300–304; 702/127
See application file for complete search history.

(56) References Cited

U.S. PATENT DOCUMENTS

| | | | | |
|---|---|---|---|---|
| 5,432,711 | A | 7/1995 | Jackson et al. | |
| 5,765,021 | A | 6/1998 | Hsu et al. | |
| 6,442,639 | B1 * | 8/2002 | McElhattan et al. | 710/303 |
| 6,473,660 | B1 * | 10/2002 | Thibault | 700/79 |
| 6,865,509 | B1 * | 3/2005 | Hsiung et al. | 702/182 |
| 7,009,987 | B1 | 3/2006 | Matsuzawa | |
| 2004/0024891 | A1 * | 2/2004 | Agrusa et al. | 709/230 |

FOREIGN PATENT DOCUMENTS

| | | | |
|---|---|---|---|
| DE | 19739297 | A1 | 3/1999 |
| DE | 197 39 297 | | 11/1999 |
| EP | 0917052 | A1 | 5/1999 |
| EP | 1045302 | A1 | 10/2000 |
| JP | 10-200545 | | 7/1998 |
| WO | WO 99/19782 | | 4/1999 |

* cited by examiner

*Primary Examiner*—Rehana Perveen
*Assistant Examiner*—Kim T. Huynh
(74) *Attorney, Agent, or Firm*—Bacon & Thomas

(57) ABSTRACT

In connection with a method for the data exchange between an operating and monitoring program BA and a field device, which is connected via a field bus adapter with the internet, the operating and monitoring program BA accesses a serial interface, which is connected with an internet interface. By means of this a data exchange between the operating and monitoring program BA via the internet is possible without extensive program changes.

10 Claims, 2 Drawing Sheets

BA
9
V
13
5
1
Internet

METHOD FOR DATA EXCHANGE BETWEEN AN OPERATING AND MONITORING PROGRAM AND A FIELD DEVICE

CROSS-REFERENCE TO RELATED APPLICATION

This application claims the benefit of the filing of Provisional Application No. 60/308,596, filed on Jul. 31, 2001.

FIELD OF THE INVENTION

The invention relates to a method for a data exchange between an operating and monitoring program and a field device, which is connected with the internet via a field bus adapter.

In process control technology, field devices are often used for detecting and affecting process values.

Examples of field devices are temperature measuring devices, which detect the temperature of a process medium, flow meters, which detect the flow of a process medium through a section of a pipeline, or fill indicators, which determine the fill level of a fluid or of bulk material in a container.

Process control is performed from a control system which is connected with the individual field devices via a data bus. All information required for process control is exchanged between the control system and the field devices via the data bus.

A data bus which is often employed operates in accordance with the HART standard of the HART$^R$ foundation. Field devices which operate in accordance with the HART standard are also called HART devices.

Besides this, Profibus$^{(R)}$ or Foundation Fieldbus$^{(R)}$, inter alia, are often employed as field buses in process automation technology.

Besides the straight transmission of measured values, field devices also permit the transmission of different information stored in the field device, for example parameters (zero point, measured value capacity, etc.), calibration curves, as well as diagnostic information. The parameters can be set from the control system or from an operating and display device.

This process is also called configuration and parameterization of the field device.

The field device must be configured and parameterized prior to each first use or after a device change.

The operating and monitoring programs mostly run on computer units (PCs, laptops), which are connected via a serial COM interface (for example RS232, RS485) with a field bus adapter connected to a field bus.

Commercially available operating and monitoring programs are, for example, CommuWin of the Endress+Hauser Maulburg, or ReadWin of the Endress+Hauser Wetzer, companies.

The disadvantage of these standard application programs lies in that they can only be used in the immediate vicinity of the field bus, since a cable connection between the computer unit and the field bus adapter is necessary. A data exchange over greater distances (worldwide in the extreme case) is therefore not possible.

In principle, standard application programs can be rewritten in such a way that they access the field devices via an internet interface. However, this requires a considerable programming outlay and extensive adaptations.

Application programs for control systems are furthermore known, which access the internet via an internet interface and establish the connection with the field buses via appropriate gateways. Worldwide access to field devices becomes possible by means of this.

In most cases, application programs for control systems are voluminous and expensive.

OBJECT AND SUMMARY OF THE INVENTION

The object of the invention is based on creating a method for data exchange between an operating and monitoring program and a field device which, by simple means and with the use of standard application programs, makes possible the access to field devices over extended distances via the internet.

This object is attained by means of a method for data exchange between an operating and monitoring program and a field device which is connected to the internet by means of a field bus adapter, and is distinguished in that the operating and monitoring program accesses a serial interface which is connected with an internet interface.

An essential idea of the invention lies in that the operating and monitoring device furthermore accesses a serial interface. Therefore the operating and monitoring devices does not "realize" that the connection to the field device does not take place via an RS232 connection, but via the internet.

Advantageous further developments of the invention are recited in the dependent claims.

In accordance with a first embodiment of the invention, the connection between the operating and application program and the internet interface takes place via a first COM interface, a zero modem cable and a second COM interface.

Here, the connection takes place via two physically present interfaces, for example COM1 and COM2 of the computer unit on which the operating and monitoring program runs.

This application only requires an appropriate driver for the internet interface which performs the program conversion and manages the addresses of the field bus adapters.

In accordance with a second embodiment of the invention, the connection between the operating and application program and the internet interface takes place via a virtual serial interface.

Although this design requires a slightly greater programming outlay, it can also be used in connection with computer units, in particular laptops, which do not have two physically present serial interfaces.

The invention will be explained in greater detail by means of the following drawings.

DETAILED DESCRIPTION OF THE PREFERRED EMBODIMENTS

Figure 1:
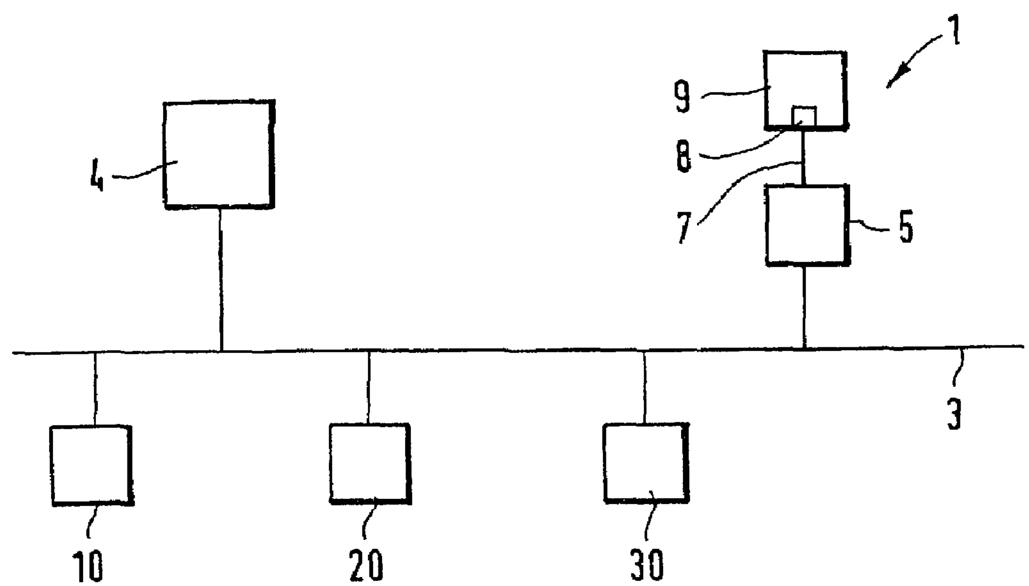
FIG. 1 shows a field bus with a computer unit and several field devices in a schematic representation.

A field bus 1 with several field devices 10, 20, 30 is represented in FIG. 1.

The field devices 10, 20, 30 are connected with a control system 4 via a data bus line 3, or with a computing unit 9 via a field bus adapter 5 (for example CommuBox of the Endress+Hauser company). To this end a connecting line 7 leads from the field bus adapter 5 to the COM plug connector 8 of the computer unit 9. Serial data transmission on the connecting line 7 takes place in accordance with the RS232 or RS485 standards.

The computer unit 9 is a personal computer (PC) or a portable laptop.

The field bus 1 operates in accordance with known international standards, such as HART$^{R}$, Profibus$^{(R)}$ or Foundation Fieldbus$^{(R)}$.

Examples of field devices are, for example, temperature measuring devices, which detect the temperature of a process medium, flow meters, which detect the flow through a section of a pipeline, or fill indicators, which determine the fill level of a bulk material in a container.

The respective measured values are transmitted to the control system 4 through the data bus line 3. The control system 4 controls the entire process course on the basis of the detected measured values.

Besides straight measured value transmission, intelligent field devices (smart field devices) allow the transmission of various information stored in the field device. Thus it is possible to call up, or change, various parameters from the control system 4, or from the computing unit 9. Such parameters are, for example, the zero point, measured value capacity (range), or the unit in which the measured value is put out.

It is moreover possible, for example in connection with fill level measuring devices operating in accordance with the echo principle, to read out echo curves. Conclusions regarding the ability of the fill level measuring device to function can be drawn from the echo curve.

Besides this it is also possible to call up diagnostic information. Some field devices are already capable of performing a self-diagnosis. This means that defined core values of the field device are monitored for deviations from the set values.

Special operating and monitoring programs are used for displaying this information and changes of the parameters. These operating and monitoring programs are installed in the computing unit 9. Customary programs directly access the COM interface 8 of the computing unit 9.

Figure 2:
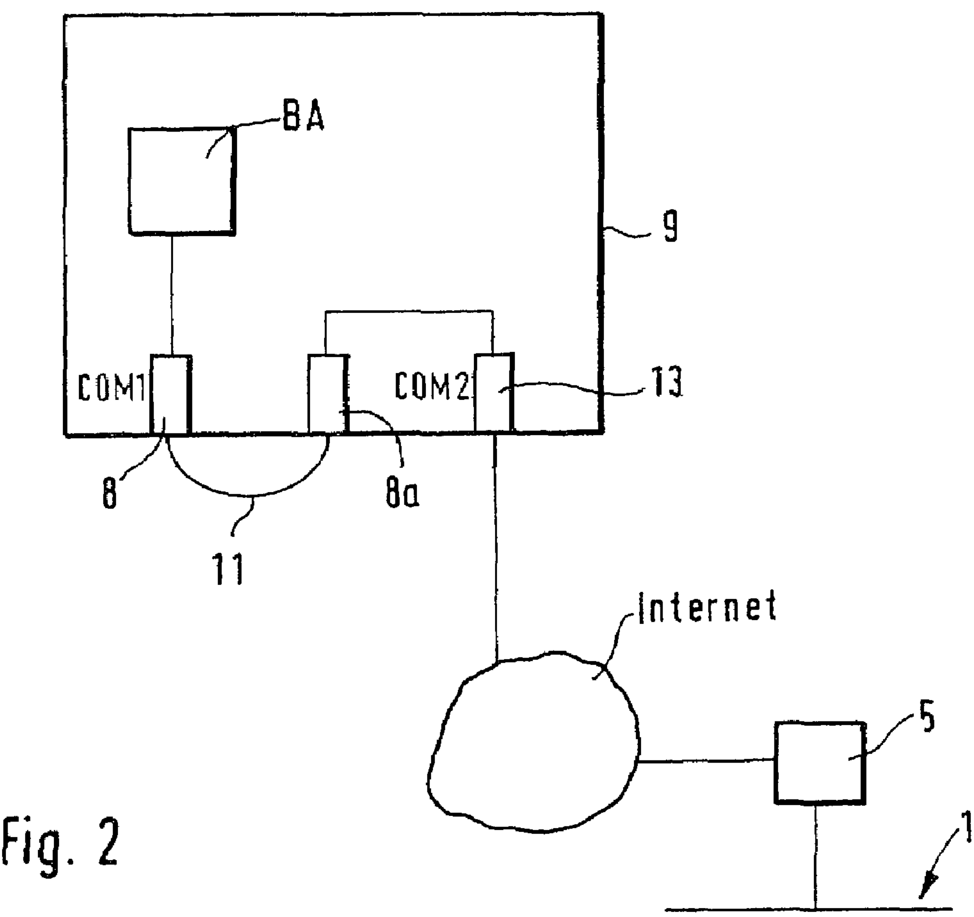
FIG. 2 shows the computer unit in accordance with a first embodiment of the invention.

FIG. 2 shows a computing unit 9 in accordance with a first embodiment of the invention. Besides a first COM interface 8, the computing unit 9 has a second COM interface 8*a*.

The two interfaces 8 and 8*a* are connected with each other by means of a null modem cable 11.

The computing unit 9 has an internet interface 13, which is connected via the internet with a field bus adapter 5 connected to the field bus 1.

The operating and monitoring program BA accesses the COM1 interface 8 of the computing unit 9 in the customary manner. The data connection with the internet interface 13 takes place via the zero modem cable 11 and the COM2 interface 8*a*. By means of an appropriate driver program (bus client), the internet interface 13 sees to the conversion of the data to the TCP/IP standard and, via a stored address book, to the selection of the appropriate internet address of the field bus adapter 9. Data are exchanged between the computing unit 9 and the field bus adapter 5 via the internet. The field bus adapter sees to the conversion of the protocol to the appropriate field bus standard, for example HART$^{R}$. The fact that several different field buses can be controlled via the internet interface 13 without mechanical re-plugging can be cited as a further advantage.

Figure 3:
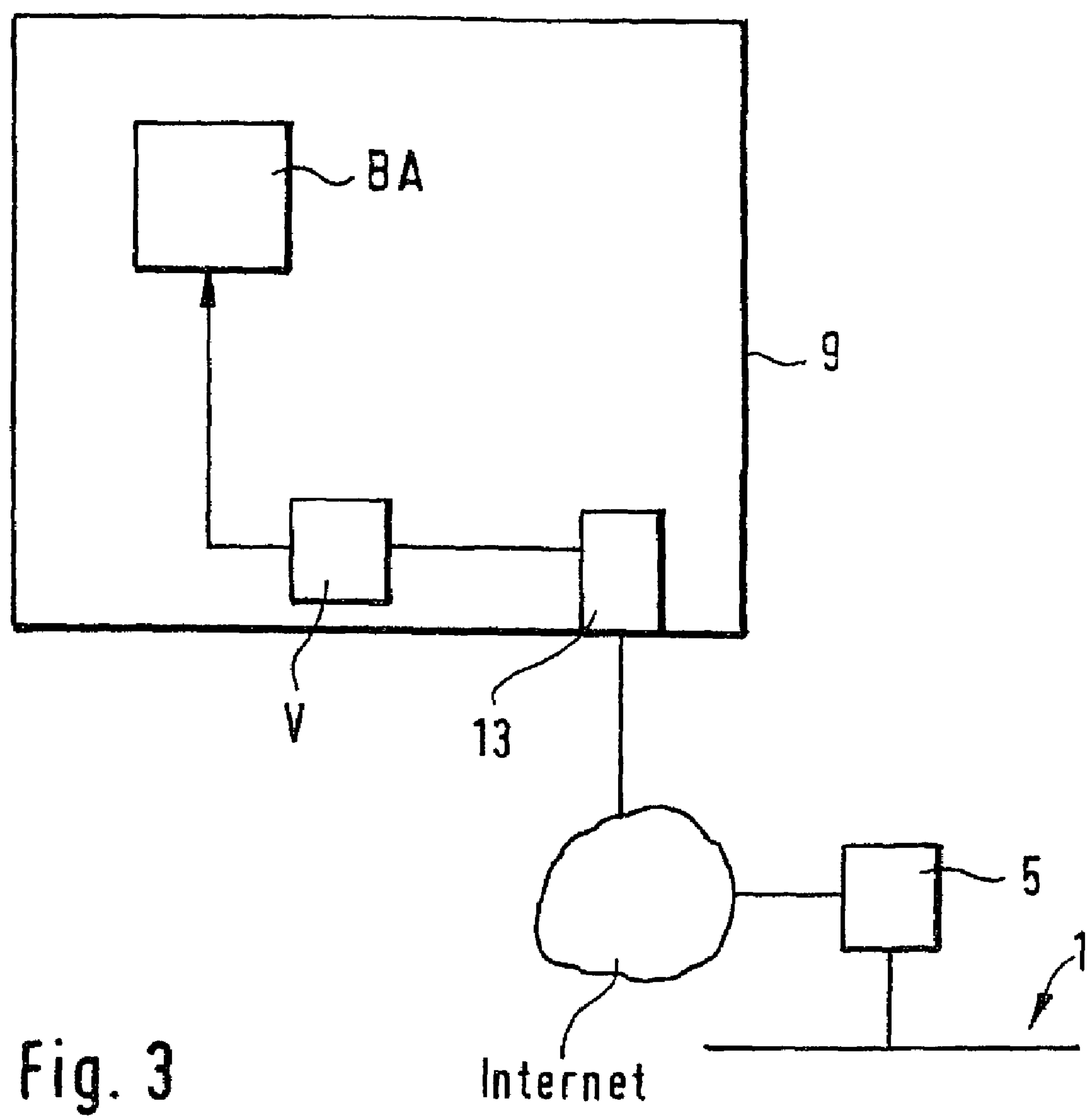
FIG. 3 shows the computer unit in accordance with a second embodiment of the invention.

FIG. 3 shows an alternative embodiment of the invention. Here, the connection between the operating and monitoring program BA and the internet interface 13 takes place via a virtual interface V.

This design requires an increased software outlay since it is necessary to write a software program for the virtual interface. But the advantage here is that it is also suitable for computing units 9 which do not have two COM interfaces, which is often the case with laptops.

The essential idea of the invention resides in that access via the internet to field devices is possible by means of conventional operating and monitoring programs, without elaborate conversions of the source code of the operating and monitoring program being necessary. This is of importance mainly when the source code of the operating and monitoring program is not known because there is no company-owned program.

What is claimed is:

1. A method for a data exchange between an operating and monitoring program BA which is running on a computing unit and a field device, comprising the steps of:

connecting the field device to the internet via a field bus adapter;

connecting the computing unit with the internet via an internet interface;

providing a connection in the computer unit between the internet interface and a serial interface; and the operating and monitoring program BA accesses the serial interface in a customary manner thereby exchanging data between the field device and the operating and monitoring program BA over the internet.

2. The method as defined as defined in claim 1, wherein the connection between the serial interface and the internat interface is provided via a first COM interface, a null modem cable and a second COM interface.

3. The method as defined in claim 1, wherein the connection between the serial interface and the internet interface is provided via a virtual interface.

4. The method as defined in claim 1, further comprising the step of:

operating the field bus adapter in accordance with the HART® standard.

5. The method as defined in claim 1, further comprising the step of:

operating the field bus adapter in accordance with the Profibus® standard.

6. The method as defined in claim 1, further comprising the step of:

operating the field bus adapter in accordance with the Foundation Fieldbus® standard.

7. A computer unit for exchanging data between an operating and monitoring program and a field device, comprising:

an internet interface for connecting the computer unit with the field device via the internet and a fieldbus adapter;

a serial interface which is accessed by the operating and monitoring program; and a connection between the serial interface and the internet interface for transferring data between the operating and monitoring program and the field device.

8. The device as defined in claim 7, wherein said field bus adapter operates in accordance with the HART® standard.

9. The device as defined in claim 7, wherein said field bus adapter operates in accordance with the Profibus® standard.

10. The device as defined in claim 7, wherein said field bus adapter operates in accordance with the Foundation Fieldbus® standard.

* * * * *